(12) United States Patent
Fuller

(10) Patent No.: US 11,602,756 B2
(45) Date of Patent: Mar. 14, 2023

(54) SYSTEM AND METHOD FOR REPLACING A ROTOR IN A MACHINE FOR GRINDING AND CHIPPING

(71) Applicant: Terex USA, LLC, Westport, CT (US)

(72) Inventor: Nathaniel Henry Fuller, Exeter, NH (US)

(73) Assignee: Terex USA, LLC, Westport, CT (US)

( * ) Notice: Subject to any disclaimer, the term of this patent is extended or adjusted under 35 U.S.C. 154(b) by 180 days.

(21) Appl. No.: 16/823,613

(22) Filed: Mar. 19, 2020

(65) Prior Publication Data

US 2020/0298250 A1 Sep. 24, 2020

Related U.S. Application Data

(60) Provisional application No. 62/821,754, filed on Mar. 21, 2019.

(51) Int. Cl.
| | |
|---|---|
| *B23P 6/00* | (2006.01) |
| *B02C 18/14* | (2006.01) |
| *B02C 18/18* | (2006.01) |
| *B02C 21/02* | (2006.01) |

(52) U.S. Cl.
CPC .......... *B02C 18/146* (2013.01); *B02C 18/184* (2013.01); *B02C 21/026* (2013.01); *B23P 6/00* (2013.01); *Y10T 29/49716* (2015.01); *Y10T 29/49718* (2015.01)

(58) Field of Classification Search
CPC ... B02C 18/146; B02C 18/184; B02C 21/026; B02C 18/16; B23P 6/00; Y10T 29/49716; Y10T 29/49718
See application file for complete search history.

(56) References Cited

U.S. PATENT DOCUMENTS

| | | | | |
|---|---|---|---|---|
| 5,484,112 | A * | 1/1996 | Koenig | B02C 18/2233 241/285.2 |
| 5,593,100 | A * | 1/1997 | Chambers, Sr. | B02C 18/0092 241/101.2 |
| 5,921,482 | A * | 7/1999 | Chou | B02C 18/142 241/236 |
| 6,092,753 | A * | 7/2000 | Koenig | B02C 18/2233 241/285.2 |
| 6,250,577 | B1 * | 6/2001 | Koenig | B02C 18/16 241/295 |
| 2005/0278949 | A1 * | 12/2005 | Miles | B23P 6/00 29/888.011 |
| 2008/0099592 | A1 * | 5/2008 | Sharp | B02C 21/02 241/273.3 |
| 2008/0283647 | A1 * | 11/2008 | Sotsky | B02C 18/2233 241/285.2 |

(Continued)

*Primary Examiner* — Sarang Afzali
*Assistant Examiner* — Darrell C Ford
(74) *Attorney, Agent, or Firm* — Simmons Perrine Moyer Bergman PLC

(57) ABSTRACT

A horizontal grinder chipper with interchangeable rotors which allows for rapid changing of said interchangeable rotors. Where the interchangeable rotors each are in the form of a cassette which can be easily inserted into and in between a first frame portion 1302 and a second frame portion 1303. A hydraulically actuated pivoting clamshell cassette covering upper portion 920 configured to pivot to an open orientation for removal of a first rotor cassette and for insertion of a second rotor cassette.

19 Claims, 8 Drawing Sheets

(56) References Cited

U.S. PATENT DOCUMENTS

| | | | |
|---|---|---|---|
| 2009/0090800 A1* | 4/2009 | Rempe | B02C 23/16 |
| | | | 241/86 |
| 2010/0090042 A1* | 4/2010 | Potts | B02C 21/026 |
| | | | 241/101.74 |
| 2011/0084154 A1* | 4/2011 | Amburgey | B02C 18/0092 |
| | | | 241/24.1 |
| 2014/0166789 A1* | 6/2014 | Yamamoto | B02C 18/0007 |
| | | | 241/101.5 |
| 2014/0263777 A1* | 9/2014 | Anderson, Jr. | B02C 4/08 |
| | | | 241/34 |
| 2015/0298132 A1* | 10/2015 | Faure | B02C 13/282 |
| | | | 241/189.1 |
| 2018/0361390 A1* | 12/2018 | Jackson | B02C 21/02 |
| 2020/0055057 A1* | 2/2020 | Stahl | B02C 18/148 |
| 2020/0340192 A1* | 10/2020 | Dickson | E01C 23/088 |
| 2021/0094040 A1* | 4/2021 | Sabol | B02C 23/36 |

* cited by examiner

PRIOR ART
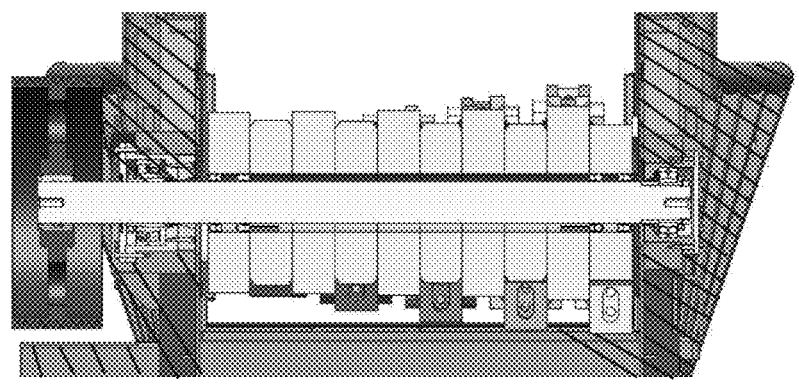
FIGURE 1
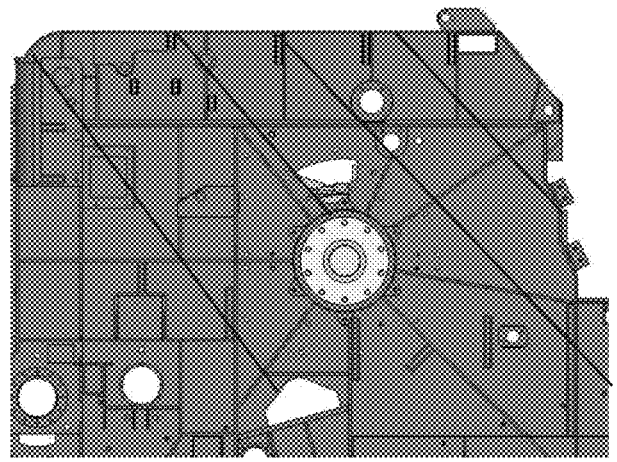
PRIOR ART    FIGURE 2

PRIOR ART

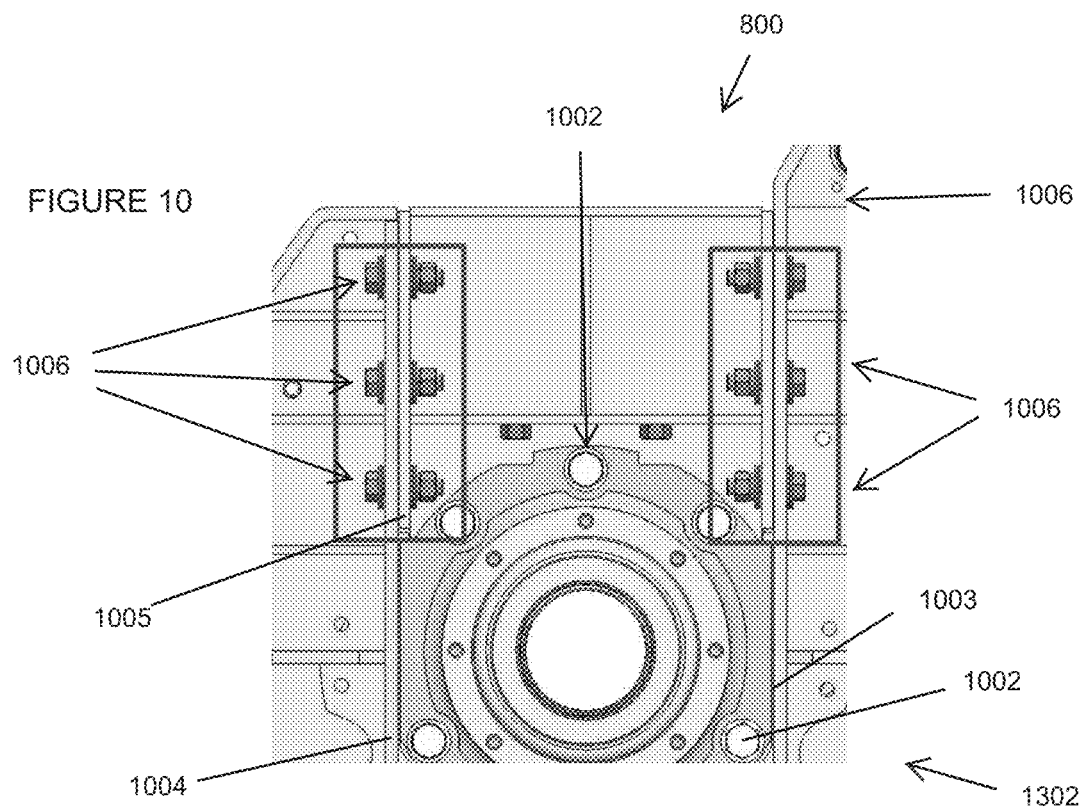

SYSTEM AND METHOD FOR REPLACING A ROTOR IN A MACHINE FOR GRINDING AND CHIPPING

CROSS REFERENCE TO RELATED APPLICATIONS

The present application claims the benefit of the filing date of provisional patent application having Ser. No. 62/821,754 filed on Mar. 21, 2019 by Nathaniel Henry Fuller entitled CBI Casette Style Rotor Design, which application is incorporated herein in its entirety by this reference.

FIELD OF THE INVENTION

The present invention generally relates to methods and equipment for chipping and grinding matter, and more particularly relates to recycling and biomass chippers and grinders.

BACKGROUND OF THE INVENTION

Often the early stages of a construction project require the relocation, recycling and/or removal of building demolition debris, whole trees, stumps, railroad ties and other items. In some situations, it may be necessary to utilize multiple different grinders and chippers because of the wide variety of matter to be processed and a variety of desired outputs. Bringing three of four different grinders and chippers to a single job site can be problematic in several ways. The transportation costs can be multiplied by the number of machines. Having the space on the job site for four large pieces of equipment, all at the same time, can cause problems. In the alternative, scheduling a series of equipment arrivals can be difficult, especially when the time needed to operate each machine may not be known with precision in advance.

Consequently, there exists a need for improved methods and equipment for efficiently chipping and grinding a wide variety of matter into a variety of output types at a single location.

SUMMARY OF THE INVENTION

It is an object of the present invention to improve the method of processing a variety of materials into a variety of different output types.

It is a feature of the present invention to effectively utilize a rotor cassette to rapidly replace or exchange rotors in a single machine for chipping and grinding.

It is an advantage of the present invention to allow for improved flexibility in processing a wide variety of matter into a variety of different output types by a single machine for chipping and grinding.

The present invention is carried out in a "multiple grinder and/or multiple chipper-less" manner, in a sense that need for more than one machine to do grinding and/or chipping of a wide variety of matter to produce a variety of output types can be eliminated or at least greatly reduced, in many situations. Additionally, the present invention provides a "green" solution by reducing the environmental impact of moving multiple large pieces of equipment, especially when the job site is in a remote and rugged location.

Accordingly, the present invention is a method of replacing a rotor in a mobile horizontal grinder comprising the steps of:

providing a first frame portion 1302 with a first frame portion slot 1304 therein and a second frame portion 1303, parallel to and spaced apart from said first frame portion 1302, said second frame portion 1303 with a second frame portion slot 1305 therein; said first frame portion 1302 and said second frame portion 1303 being coupled to a third frame portion configured to support an internal combustion engine having a horsepower characteristic in excess of eight hundred horse power;

removing, from a first frame portion slot 1304 in a first frame portion 1302, a first preassembled rotor cassette having a rotor shaft therein and having a rotor cassette bottom portion, having a predetermined rotor cassette bottom portion shape, wherein said first frame portion slot 1304 has a slot bottom portion having said predetermined rotor cassette bottom portion shape and is configured to receive therein and support from below said first preassembled rotor cassette;

providing a second preassembled rotor cassette comprising:
  a. rotor shaft 500;
  b. first side bearing housing mount 504;
  c. second side bearing housing mount 505;
  d. rotor 501;
  e. first side bearing 608; and
  f. second side bearing 708; and lowering into said first frame portion slot 1304 and said second frame portion slot 1305 said second preassembled rotor cassette.

Additionally, the present invention is an improved system for a continuous track propelled horizontal grinder comprising:

a first frame portion 1302 with a first frame portion slot 1304 therein and a second frame portion 1303, parallel to and spaced apart from said first frame portion 1302, said second frame portion 1303 with a second frame portion slot 1305 therein; said first frame portion 1302 and said second frame portion 1303 being coupled to a third frame portion configured to support an internal combustion engine having a horsepower characteristic in excess of eight hundred horse power;

said first frame portion 1302 having a feed end frame to cassette slot defining surface 1004 and output end frame to cassette slot defining surface 1003 each with a plurality of bearing housing mount fasteners receiving holes therethrough;

a first preassembled rotor cassette having a rotor shaft therein and having a predetermined rotor cassette bottom portion shape from a first frame portion slot 1304 in a first frame portion 1302, wherein said first frame portion slot 1304 has a bottom portion having said predetermined rotor cassette bottom portion shape and is configured to receive therein and support from below said first preassembled rotor cassette; and a second preassembled rotor cassette comprising;
  a. rotor shaft 500;
  b. first side bearing housing mount 504;
  c. second side bearing housing mount 505;
  d. rotor 501;
  e. first side bearing 608; and
  f. second side bearing 708;

said second preassembled rotor cassette being configured to be interchangeable with said first preassembled rotor cassette by being capable of being lowered into said first frame portion slot 1304 and said second frame portion slot 1305 in an absence of said first preassembled rotor cassette; and a plurality of bearing housing mount fasteners 1006 configured to be inserted through said plurality of bearing housing mount fasteners receiving holes to retain said second preassembled rotor cassette in said first frame portion slot 1304.

BRIEF DESCRIPTION OF THE DRAWINGS

The invention may be more fully understood by reading the following description of the preferred embodiments of the invention, in conjunction with the appended drawings wherein:

FIG. 1 is a cross-sectional view of a representative rotor set up for a prior art horizontal grinder.

FIG. 2 is a side view of a grinder frame of the prior art.

FIG. 10 is a close-up view of portions of the present invention with the pivoting top portion as it was in FIG. 9, but showing the rotor cassette after it has been inserted and bolted into the non-pivoting rotor cassette receiving portion.

FIG. 11 is a view of a portion of the present invention after the pivoting top portion has been closed down over the rotor cassette.

DETAILED DESCRIPTION

Figure 3:
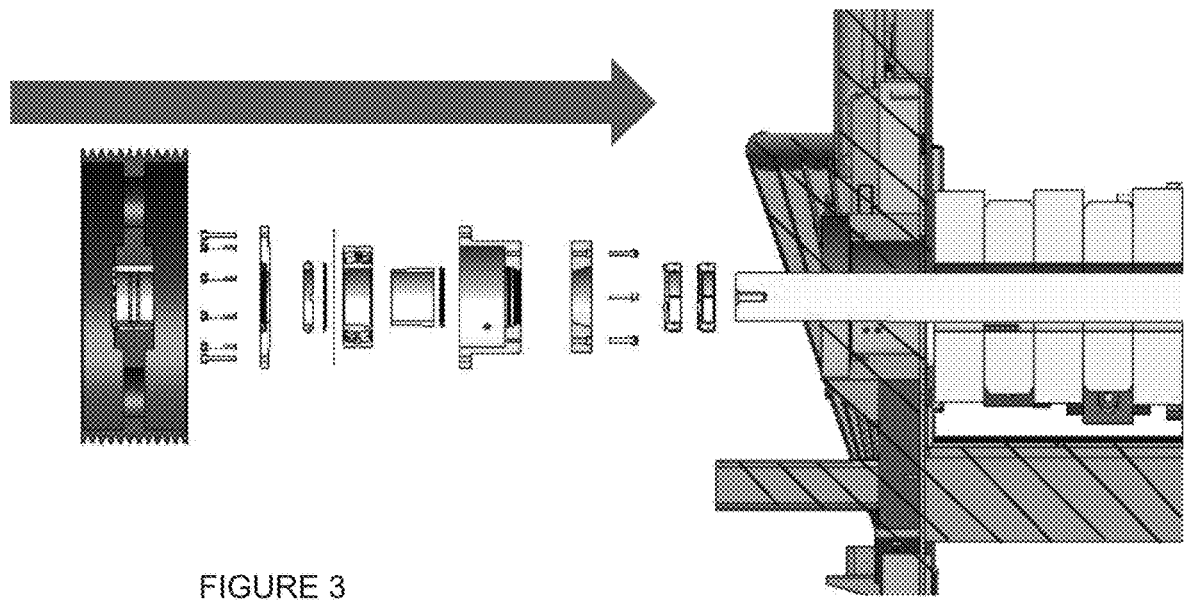
FIG. 3 is an exploded view of the configuration of the drive side of the machine of FIG. 1.

Although described with particular reference to a track propelled belt driven horizontal chipper/grinder, it should be understood that the innovative and beneficial aspect of the systems and methods of the present invention can be implemented for other configurations as well.

The systems and methods of the present invention described herein can be viewed as examples of many potential variations of the present invention which are protected hereunder. The following details are intended to aid in the understanding of the invention whose scope is defined in the claims appended hereto. The following description should be viewed as an example of other embodiments of the present invention, which may employ systems and methods which deviate from the details described below, without departing from the spirit and the intended scope of the invention.

Now referring to the drawings wherein like numerals refer to like matter throughout, and more particularly in FIG. 1, there is shown a prior art rotor setup for a wood grinding and chipping machine. Typically, the rotor is dropped between the side walls of a frame and a shaft, locking devices, bearings, seals, etc. are installed through the side of the frame. The items in FIGS. 1-4, with a left to right downward hatching mark, are part of the machine frame. The components that are not so hatched are loose parts that are assembled together to form a complete rotary assembly.

Now referring to FIG. 2, which shows a prior art grinder frame, which tends to show that no other way to install the rotor exists other than through the side of the machine.

Figure 4:
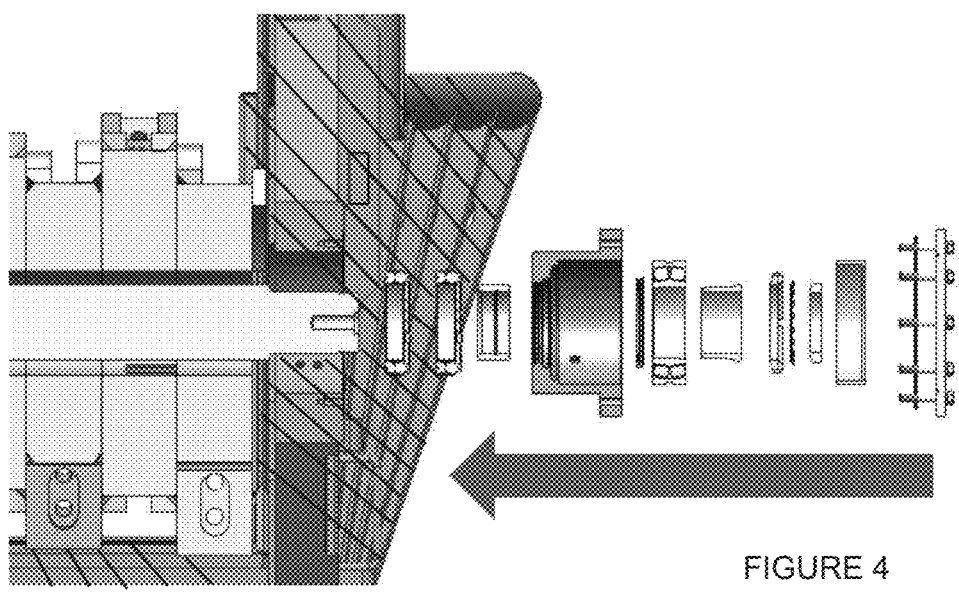
FIG. 4 is an exploded view of the non-drive side of the machine of FIGS. 1 and 3.

Now referring to FIGS. 3 and 4 where the loose components are installed from the outside of the frame, part by part. To properly install the rotor, one assembler may be simultaneously required on each side of the machine to ensure alignment is maintained while parts are being installed. The arrow shows the direction of motion of the parts during the installation process.

Figure 5:
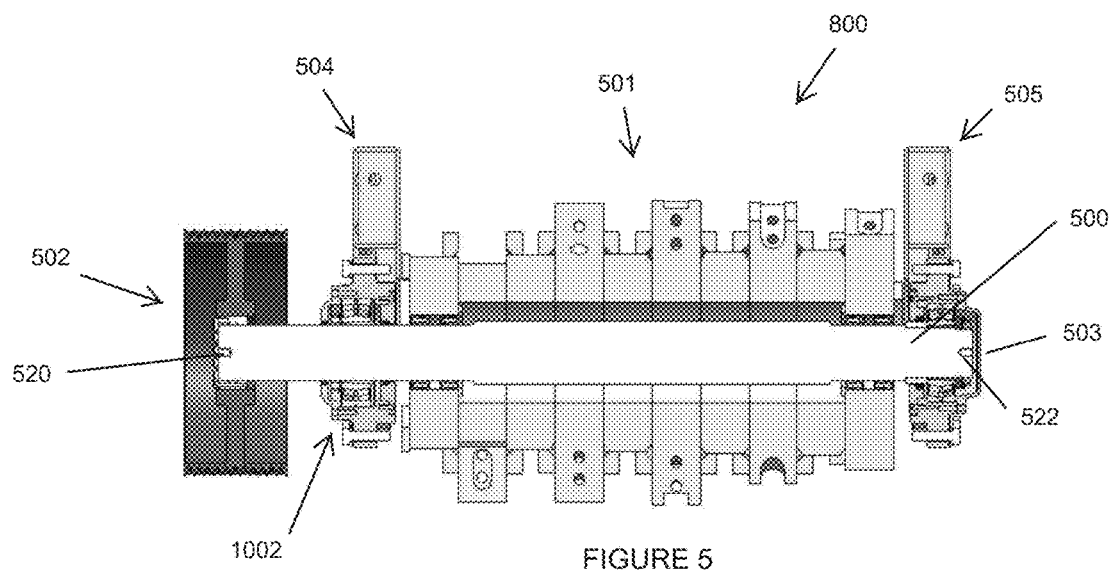
FIG. 5 is cross-sectional view of the rotor cassette portion of the present invention also shown in FIG. 8.
Figure 12:
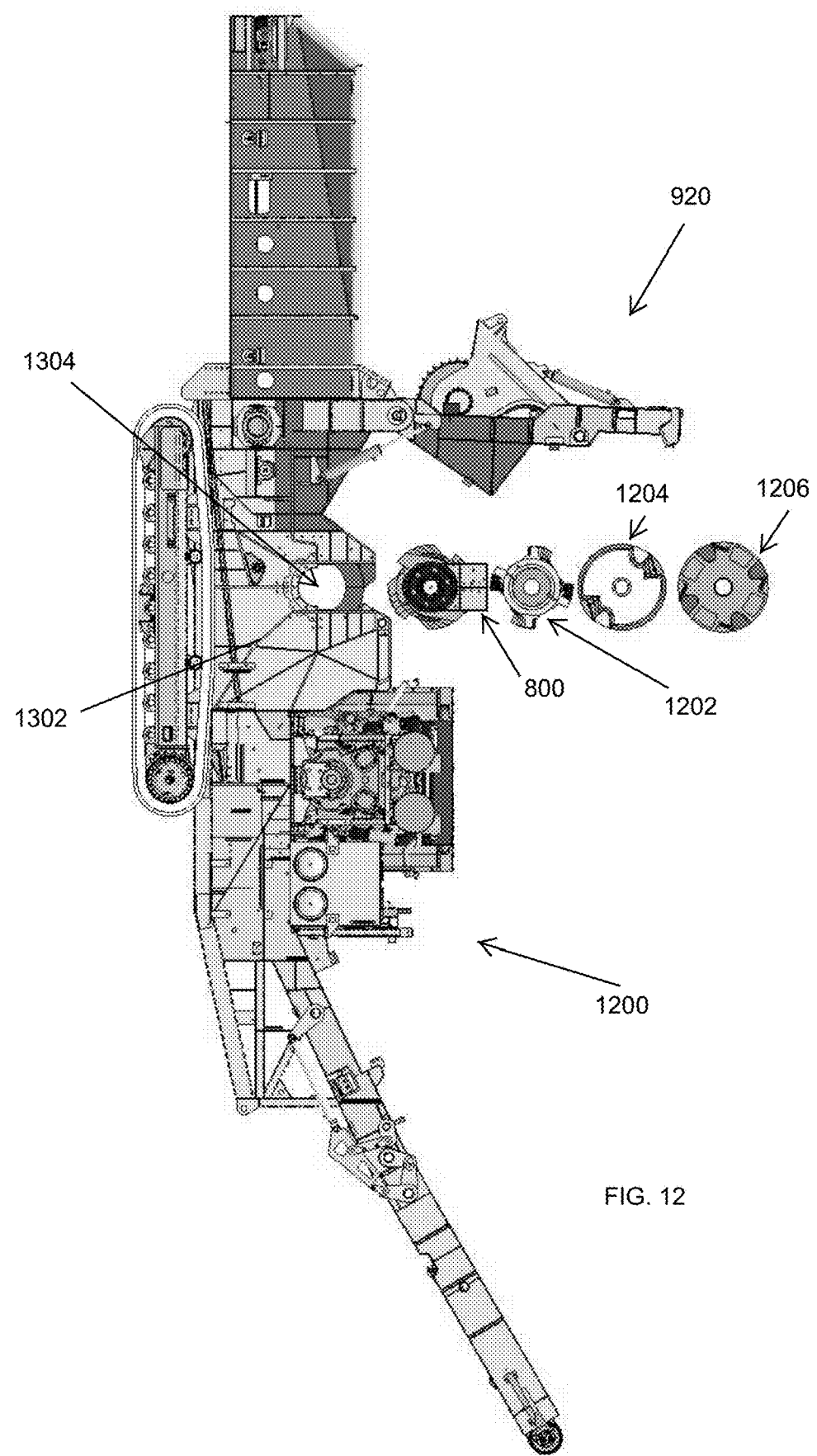
FIG. 12 is a side view of the horizontal grinder of the present invention, with some portions shown in an exploded configuration.

Now referring to FIG. 5, there is shown a cross-sectional view of the assembled rotor cassette 800 of the present invention which includes a rotor shaft 500 and a rotor 501, which is coupled to a sheave 502. The opposing end of rotor shaft 500 is a bearing housing cover 503 which covers the cap end rotor shaft central longitudinal axis feature 522. The longitudinal axis of the rotor runs from sheave end rotor shaft central longitudinal axis feature 520 to cap end rotor shaft central longitudinal axis feature 522. The structural mounting members first side bearing housing mount 504 and second side bearing housing mount 505 help to couple the many parts of the rotor cassette 800 to a first frame portion 1302 of the continuous track propelled horizontal chipper grinder 1200 (FIG. 12).

Figure 6:
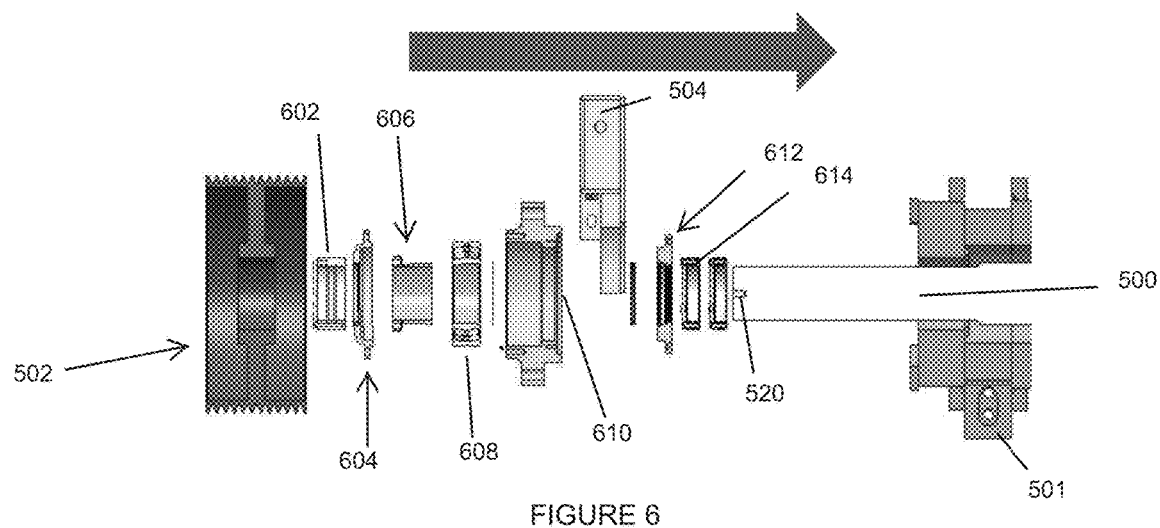
FIG. 6 is an exploded view of the configuration of the drive side of the rotor cassette portion of FIG. 5.

Now referring to FIG. 6, there is shown more detail portion of sheave end of the rotor cassette 800. The loose components are slid onto the rotor shaft 500 in the direction of the arrow. First side keyless locking device 614 is shown in a position to be slid on before first side labyrinth seal 612. The first side bearing housing mount 504 is configured to be coupled, via bearing housing fasteners 1002 (FIG. 5), to the first side bearing housing 610 disposed about the first side bearing 608, which is disposed around rotor shaft 500. First side lock washer and lock nut combination 606 is also shown and is adjacent to first side bearing housing cover 604, which is adjacent to first side keyless locking device 602, which is disposed inside of the sheave 502.

Figure 7:
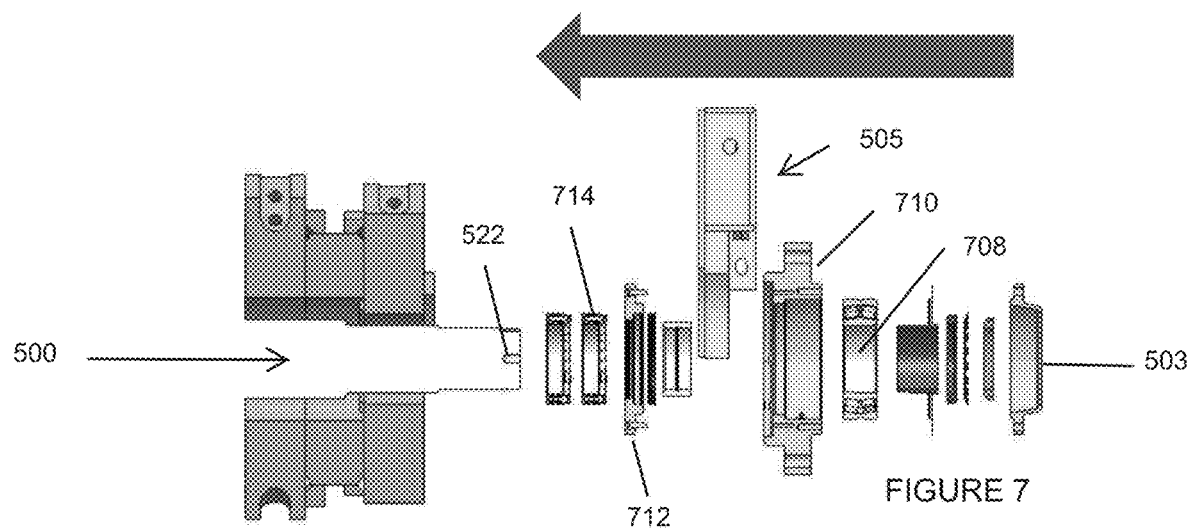
FIG. 7 is an exploded view of the non-drive side of the rotor cassette portion of FIGS. 5 and 6.

Now referring to FIG. 7, there are shown similar components to the opposing end. Second side keyless locking device 714 is shown near the cap end rotor shaft central longitudinal axis feature 522 of the rotor shaft 500 and adjacent to the second side labyrinth seal 712. Second side bearing housing 710 is shown and sized to retain therein second side bearing 708, which is adjacent to additional internal components and ended with bearing housing cover 503.

Figure 8:
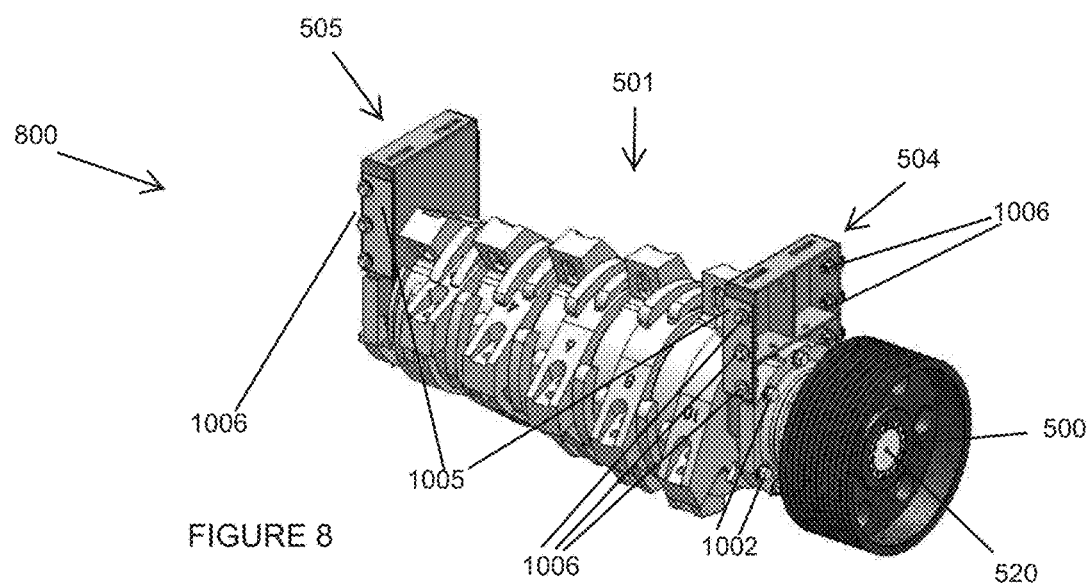
FIG. 8 is a perspective view of the rotor cassette as shown in the cross-section in FIG. 5.

Now referring to FIG. 8, there is shown the rotor cassette 800 of the present invention, which is bounded on one end by second side bearing housing mount 505 and on the opposing end by first side bearing housing mount 504 and the sheave 502, which exposes at its center rotor shaft 500 with its sheave end rotor shaft central longitudinal axis feature 520. Also shown are bearing housing mount fasteners 1006, which are used to mate the cassette defining surface 1005 of the rotor cassette 800 to the feed end frame to cassette slot defining surface 1004. These fasteners can be six sets of 1" bolts and nuts through holes, or other suitable fasteners. Bearing housing fasteners 1002 are also shown.

Figure 9:
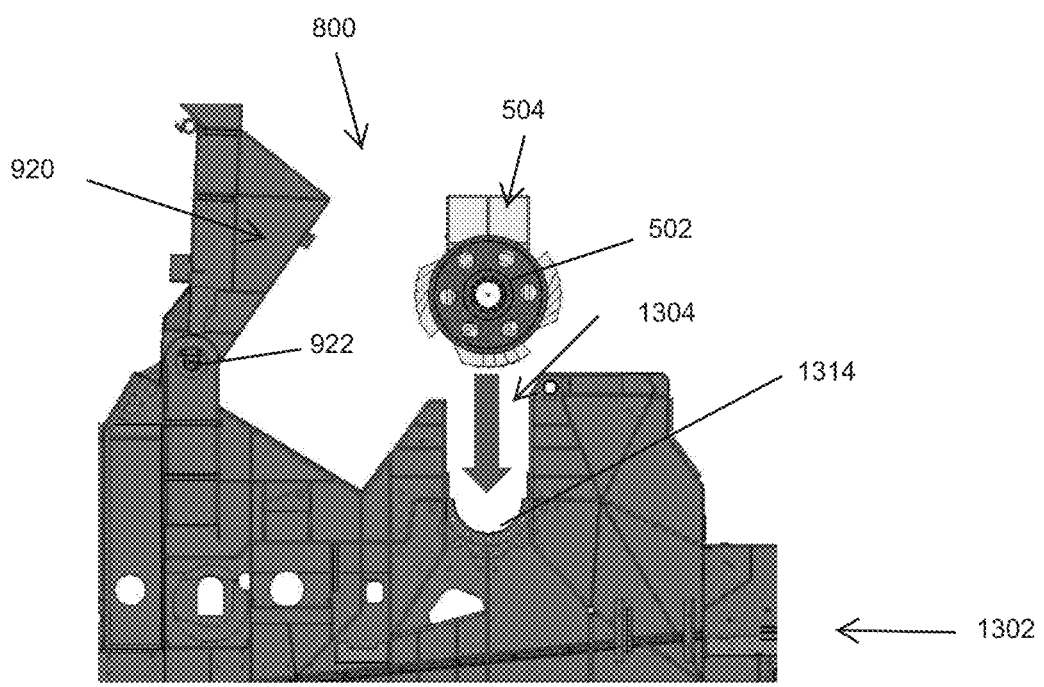
FIG. 9 is a side view of portions of the present invention, which includes a pivoting top portion in an open configuration, a non-pivoting rotor cassette receiving portion and the rotor cassette of FIGS. 5-8 in the process of insertion.

Now referring to FIG. 9, there is shown a portion of the present invention in the process of installing a new rotor cassette 800 into a first frame portion slot 1304, having a first frame slot bottom portion 1314 in first frame portion 1302.

The weight of the pivoting clamshell cassette covering upper portion 920 with a feed end pivot point 922 helps to hold the rotor cassette 800 in place in the first frame slot bottom portion 1314 during operation.

Now referring to FIG. 10, there is shown a close up view of portions of the present invention including: first frame portion 1302, with its first frame portion slot 1304 filled with rotor cassette 800, included is a close up view of the bearing housing mount fasteners 1006, which connect feed end frame to cassette slot defining surface 1004 and cassette defining surface 1005, bearing housing fasteners 1002 are also shown.

Now referring to FIG. 11, there is shown a zoomed out view of the same portion of the present invention plus pivoting clamshell cassette covering upper portion 920 and also shows upper weldment wedge lock 1102, which helps to retain the pivoting clamshell cassette covering upper portion 920 in position.

Now referring to FIG. 12, there is shown a perspective view of the horizontal grinder of the present invention, generally designated 1200 in a process of installation of removal of the rotor cassette 800 and also shows three alternate rotors, including a drum rotor 1202, two cutter chipper rotor 1204 and a four cutter chipper rotor 1206.

Figure 13:
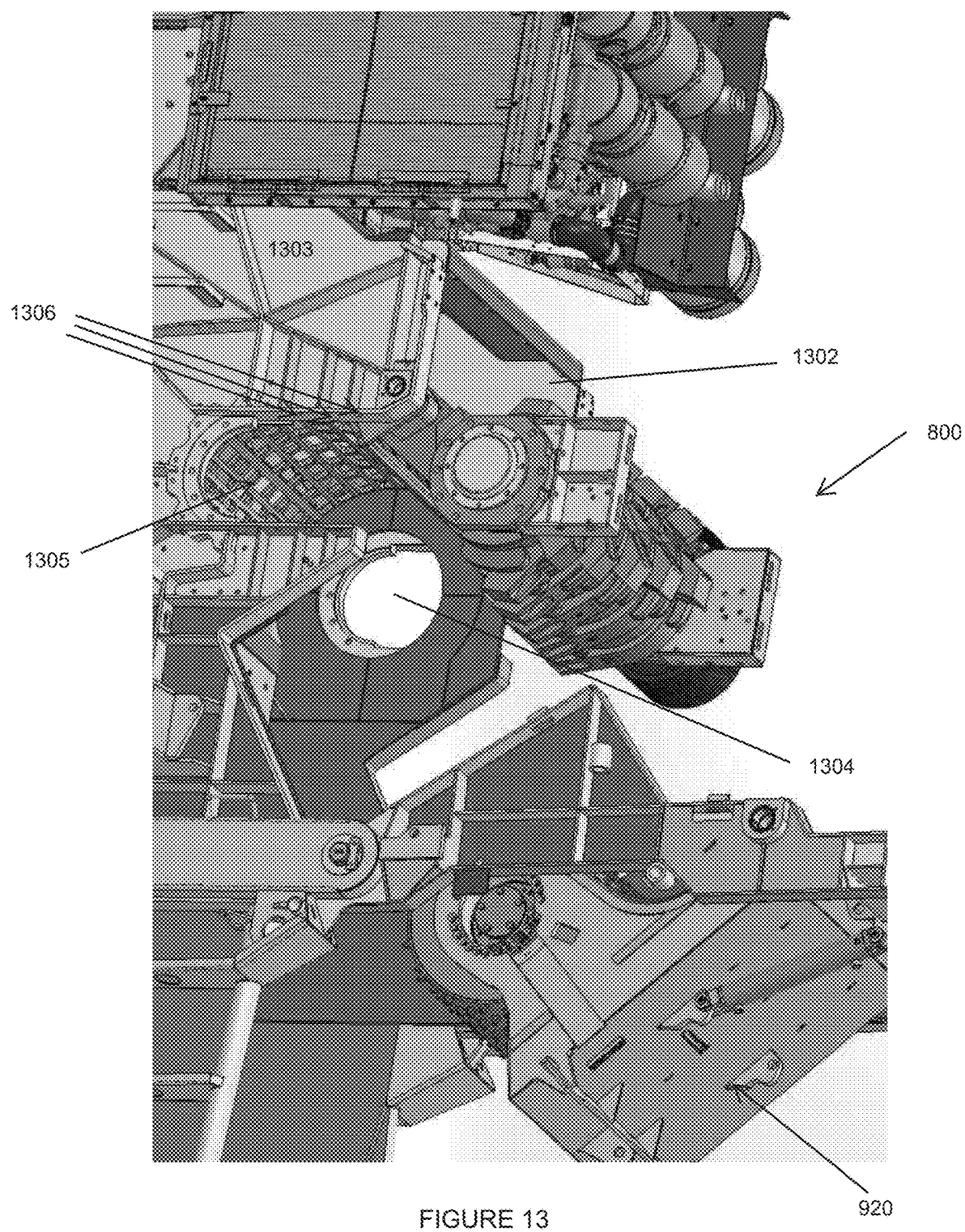
FIG. 13 is a perspective view of portions of the present invention.

Now referring to FIG. 13, there is shown a perspective view of portions of the present invention from the second or non-sheave side. Shown is first frame portion 1302, first frame portion slot 1304, with an internal grate frame, grate liner, wear liners, and other components necessary for grinding or chipping, which may partially block sight to portions thereof. Second frame portion 1303 with second frame portion slot 1305 is clearly shown with the rotor cassette 800 in a position where it is about to be installed or it has just been removed. Pivoting clamshell cassette covering upper portion 920 is shown pivoted upward to allow access to second frame portion slot 1305 and first frame portion slot 1304. Also shown is a plurality of bearing housing mount fasteners receiving holes 1306 for attaching the rotor cassette 800. An identical group of holes would be disposed in the corresponding location in first frame portion slot 1304.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof.

I claim:

1. A method of replacing a rotor in a mobile horizontal grinder comprising the steps of:
   providing a first frame portion with a first frame portion slot therein and a second frame portion, parallel to and spaced apart from said first frame portion, said second frame portion with a second frame portion slot therein;
   removing, from a first frame portion slot in a first frame portion, a first preassembled rotor cassette having a rotor shaft therein and having a rotor cassette bottom portion, having a predetermined rotor cassette bottom portion shape, wherein said first frame portion slot has a slot bottom portion having said predetermined rotor cassette bottom portion shape and is configured to receive therein and support from below said first preassembled rotor cassette;
   providing a second preassembled rotor cassette comprising:
   a. rotor shaft;
   b. first side bearing housing mount;
   c. second side bearing housing mount;
   d. rotor;
   e. first side bearing; and
   f. second side bearing; and
   moving in combination as a rigid body, via translational motion, all portions of said second preassembled rotor cassette into said first frame portion slot and said second frame portion slot said second preassembled rotor cassette.

2. The method of claim 1 wherein said step of moving involves rectilinear translational motion.

3. The method of claim 2 wherein said rotor is one of a plurality of interchangeable different purpose rotors wherein said plurality includes a grinding drum rotor and a chipper rotor.

4. The method of claim 3 wherein said rotor has a different purpose than a rotor included in said first preassembled rotor cassette.

5. The method of claim 4 further comprising a step of using a plurality of fasteners to couple said second preassembled rotor cassette through said plurality of holes.

6. The method of claim 5 wherein said step of moving is accomplished with assistance from an overhead crane.

7. The method of claim 5 wherein said plurality of fasteners includes all fasteners securing said second preassembled rotor cassette to either of said first frame portion and said second frame portion.

8. The method of claim 5 wherein said second preassembled rotor cassette is free of any fasteners used for coupling to either of said first frame portion or second frame portion at a point lower than a central longitudinal axis of said rotor shaft when said rotor cassette bottom portion contacts said first frame portion.

9. The method of claim 8 wherein said third frame portion is supported above and propelled across the ground by a track drive system comprising a continuous earth engaging track with a plurality of wheels therein which are configured to operate without directly engaging the ground.

10. The method of claim 1 wherein said predetermined rotor cassette bottom portion shape is a portion of circle centered upon a central longitudinal axis of said rotor shaft.

11. A method of replacing a rotor in a mobile horizontal grinder comprising the steps of:
    providing a first frame portion with a first frame portion opening therein and a second frame portion, spaced apart from said first frame portion, said second frame portion with a second frame portion opening therein;
    removing, from a first frame portion opening in a first frame portion, a first preassembled rotor cassette having a rotor shaft therein and having a rotor cassette bottom portion, having a cassette bottom portion shape, wherein said first frame portion opening has an opening bottom portion having said cassette bottom portion shape and is configured to receive therein said first cassette;
    providing a second preassembled cassette comprising:
    a shaft;
    a first side bearing mount with a bearing mount mounting hole therein;
    a second side bearing mount;
    a rotor;
    a first side bearing; and
    a second side bearing;

moving into said first frame portion opening and said second frame portion opening said second preassembled rotor cassette;

wherein said first frame portion and said second frame portion each have a plurality of frame holes therein configured to receive a plurality of fasteners therethrough for securing said first preassembled rotor cassette; and wherein said step of moving further comprising the step of causing said bearing mount mounting hole to approach, pass and proceed further past of said plurality of frame holes.

12. The method of claim 11 wherein said step of moving involves moving in combination as a rigid body, all portions of said second preassembled rotor cassette.

13. The method of claim 12 wherein said step of moving is rectilinear translational motion.

14. The method of claim 12 wherein said rotor is one of a plurality of interchangeable different purpose rotors wherein said plurality includes a grinding drum rotor and a chipper rotor.

15. The method of claim 14 wherein said rotor has a different purpose than a rotor included in said first preassemble rotor cassette.

16. The method of claim 15 further comprising a step of using a plurality of fasteners to couple said second preassembled rotor cassette through said plurality of frame holes.

17. A method of replacing a rotor in a mobile horizontal grinder comprising the steps of:

providing a first frame portion with a first frame portion opening therein and a second frame portion, spaced apart from said first frame portion, said second frame portion with a second frame portion opening therein; said first frame portion and said second frame portion being coupled to a third frame portion configured to support a source of rotary power;

removing, from a first frame portion opening in a first frame portion, a first cassette having a shaft therein and having a cassette bottom portion, having a predetermined cassette bottom portion shape, wherein said first frame portion opening has an opening bottom portion having said predetermined rotor cassette bottom portion shape and is configured to receive therein said first cassette;

providing a second preassembled rotor cassette comprising:

a rotor shaft;

a first side bearing mount;

a second side bearing mount;

a rotor;

a first side bearing; and a second side bearing; and moving, as a rigid body, all portions of said second cassette into said first frame portion opening and said second frame portion opening.

18. The method of claim 17 wherein said step of moving is via translational motion.

19. The method of claim 18 wherein said translational motion is rectilinear translational motion.

\* \* \* \* \*